United States Patent [19]
Tsukamoto

[11] 3,878,264
[45] Apr. 15, 1975

[54] MODIFIED-AMINOPLAST MOULDING COMPOSITIONS

[75] Inventor: Akira Tsukamoto, Osaka, Japan

[73] Assignee: British Industrial Plastics Limited, Manchester, England

[22] Filed: Oct. 1, 1973

[21] Appl. No.: 402,206

[30] Foreign Application Priority Data
Sept. 29, 1972 Japan.............................. 47-97791
Sept. 29, 1972 Japan.............................. 47-97792

[52] U.S. Cl. ........ 260/852; 260/17.3; 260/17.4 BB; 260/17.4 CL; 260/42; 260/42.17; 260/42.18; 260/42.47; 260/79.5 NV; 260/79.5 C; 260/83.3
[51] Int. Cl... C08c 11/04; C08c 11/16; C08g 51/18
[58] Field of Search........... 260/83.3, 852, 79.5 NV, 260/79.5 C, 42, 42.17, 42.18, 42.47, 17.3, 17.4 BB, 17.4 CL

[56] References Cited
UNITED STATES PATENTS
3,208,980   9/1965   Gruver et al...................... 260/83.3
3,345,206   10/1967  Korpman ........................... 260/852
3,743,612   7/1973   Vial ................................. 260/852

FOREIGN PATENTS OR APPLICATIONS
1,195,741   6/1970    United Kingdom
1,296,095   11/1972   United Kingdom
1,522,034   4/1968    France
2,035,726   12/1970   France Primary Examiner—Donald E. Czaja
Assistant Examiner—H. H. Fletcher
Attorney, Agent, or Firm—Cushman, Darby & Cushman

[57] ABSTRACT

Aminoplast resin moulding compositions are modified by the inclusion of a liquid rubber which is an acrylonitrile-butadiene rubber with terminal carboxyl- or mercaptan groups, or an epoxy-modified carboxyl-terminated acrylonitrile-butadiene liquid rubber. Mouldings exhibit good bending strength with improvements in impact resistance and in other properties.

1 Claim, No Drawings

MODIFIED-AMINOPLAST MOULDING COMPOSITIONS

This invention concerns improvements in or relating to modified amino resin moulding compositions.

Aminoplast resins such as urea-formaldehyde and melamine-formaldehyde resins are commonly used as moulding materials, in admixture with inorganic fillers or reinforcing agents such as metal carbonates or glass or asbestos fibres for improving impact strength or for lessening shrinkage. Mouldings made from such compositions tend to have low resistance to cracking, and, owing to low miscibility of the filler in the resin, the good surface characteristics obtainable for amino resin mouldings are reduced. There is also a tendency to reduce the bending strength. To overcome these disadvantages, it has been proposed that the amino resin be modified by mixing it with an epoxy resin, but this lowers the water absorption of the resultant mouldings.

An object of the present invention is to obviate or mitigate the above-mentioned disadvantages.

According to the present invention there is provided a modified aminoplast resin mould composition, comprising -
a. An amino-formaldehyde resin
b. A liquid rubber which is -
   i. A low molecular weight carboxyl - or mercaptan terminated acrylonitrile butadiene rubber, or
   ii. A carboxyl-terminated acrylonitrile butadiene rubber crosslinked with an epoxy resin; and
c. A filler In another aspect, the present invention provides a first method of manufacturing modified aminoplast resin moulding compositions as aforesaid, comprising (a) producing a modified aminoplast resin by mixing an aminoformaldehyde resin with a liquid rubber which is low molecular weight carboxyl - or mercaptan - terminated acrylonitrile butadiene rubber, and (b) mixing the modified aminoplast resin with a filler.

A second method of manufacturing the aforesaid compositions comprises producing an epoxy-modified rubber by reacting a low molecular weight, low melting epoxy resin with a low molecular weight carboxyl-terminated acrylonitrile butadiene liquid rubber in the presence of an aminoformaldehyde resin syrup, before or after mixing the resins with a filler.

The liquid rubbers used in the present invention are liquid acrylonitrile butadiene rubbers with mercaptan end groups or carboxyl end groups (the latter being modified with epoxy resin if desired), having an approximate mean molecular weight within the range from 1,000 to 10,000. The formulae for these rubbers are -

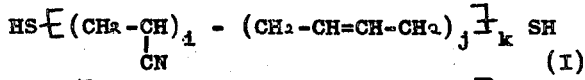

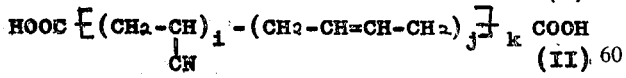

wherein $i$, $j$ and $k$ are each a positive integer; such liquid rubbers have an acrylonitrile content from 15 to 30% by weight. The mercaptanterminated rubbers may be produced by utilising the method disclosed in U.K. Pat. No. 1139655.

A preferred embodiment of the first method of this invention comprises adding from 0.1 to 8 parts, more preferably from 0.5 to 2 parts, by weight of carboxyl - or mercaptan terminated acrylonitrile butadiene liquid rubber to 100 parts by weight of amino-formaldehyde resin during a kneading stage, and mixing the resultant modified aminoplast resin with inorganic filler (preferably a fibrous reinforcing filler) during a crushing stage, to produce a modified amino resin moulding composition.

The amount of liquid rubber used in this first method must be increased in proportion to increasing amounts of filler within the above range. The use of less than 0.1 parts of liquid rubber per 100 parts aminoformaldehyde resin has little effect on improving the dispersion of the filler or on the bending strength whilst the use of over 8 parts greatly deteriorates the surface condition of the mouldings since in the latter event the liquid rubber will tend to "bleed", the stripping property will decrease and surface lustre will diminish.

In a preferred embodiment of the second method, a low molecular weight, low melting epoxy resin is mixed with a carboxyl terminated acrylonitrile butadiene liquid rubber during a kneading stage, and the carboxyl groups of the rubber are reacted with the epoxy groups of the epoxy resin during a drying stage, to increase the molecular weight of the rubber and to chemically bond the aminoformaldehyde resin with a portion of the rubber.

A crosslinking agent such as ethylenediamine or triethylene diamine may be added to accelerate the reaction of the epoxy resin with the carboxyl groups of the rubber, and to initiate the carboxyl groups of the rubber, and the methylol groups when a urea-formaldehyde resin is used. In this second method, it is preferred to use from 0.5 to 20 parts by weight of the acrylonitrile butadiene rubber per 100 parts of aminoformaldehyde resin, for the same reasons as mentioned for the first method. It is also preferred to use from 5 to 100 parts of epoxy resin per 100 parts of acrylonitrile butadiene liquid rubber, since the use of less than 5 parts gives insufficient crosslinking, whilst the use of more than 100 parts detracts from the desired rubbery properties of the modified rubber. A diamine hardening agent may be used in small amount, when necessary. Thus amino resin moulding compositions are obtainable by thoroughly mixing an amino resin syrup, a carboxyl-terminated acrylonitrile rubber, an epoxy resin and a filler (preferably α-cellulose pulp), together with any desired additive(s) such as a parting agent or hardener, during a kneading stage, followed by effecting reaction of the liquid rubber and epoxy resin during a drying stage, and then crushing the resultant mixture. In order to mix an epoxy resin with an amino resin syrup during a kneading stage, it is necessary to heat the system to about 40°C. The use of a high melting epoxy resin results in poor dispersion during the kneading stage and results in variation of quality in finished mouldings.

The following Examples 1 to 6 are given to illustrate preferred embodiments of this invention; Examples 7 to 10 are presented for comparative purposes. The term parts means parts by weight.

EXAMPLE 1

An amino resin syrup was obtained by heating a mixture of 100 parts urea, 200 parts of 37% formalin and 5 parts of hexamethylenetetramine, for two hours at 40°C.

The amino resin syrup was thoroughly mixed in a kneader with 0.05 part of ammonium chloride, 60 parts of paper pulp, 0.5 part of zinc oxide, 0.2 part of zinc stearate and 4.5 parts of a liquid acrylonitrile-butadiene rubber having carboxyl end groups with a mean molecular weight of 3,400. The mixture was dried at 80°C for 90 minutes in a hot air dryer, and 0.2 part of zinc stearate as a parting agent was added, per 100 parts of the dried mixture, and then the resultant mixture was crushed in a pot mill to yield a urea resin moulding compound. The moulding compound was thoroughly mixed with 20 parts of glass fibre (length 10 mm) in a highspeed rotary mixer and extruded from a Plastograph extruder operating with a screw rotational velocity of 30 revs. per minute, a die temperature of 80°C and rear temperature of 60°C. A granular urea resin moulding composition was obtained after cutting the extrudate.

EXAMPLE 2

To 305 parts of a urea resin syrup obtained as described in Example 1 were added 60 parts of paper pulp, 0.5 part of zinc oxide, 0.2 part of zinc stearate, and 2.5 parts of a liquid acrylonitrile butadiene rubber with mercaptan end groups (mean molecular weight 1,800), with thorough mixing in a kneader. The mixture was dried at 80°C for 90 minutes in a hot air dryer, then 0.2 part of zinc stearate as parting agent was added per 100 parts of the dried mixture which was then crushed in a pot mill to yield an urea resin moulding compound.

8 parts of asbestos fibre were thoroughly mixed with the urea resin moulding compound in a highspeed rotary mixer, and the resultant mixture was extruded from a Plastograph extruder operating at the same conditions as in Example 1. A granular urea resin moulding composition was obtained after cutting the extrudate.

EXAMPLE 3

A melamine resin syrup was obtained by heating and stirring for 60 minutes, 120 parts of melamine, 158 parts of 37% formalin and 0.3 part of caustic soda. To 305 parts of this resin syrup were added 60 parts of paper pulp, 3 parts of zinc oxide, 0.3 part of zinc stearate and 1.6 parts of a liquid acrylonitrile-butadiene rubber having carboxyl end groups (mean molecular weight 4,300). Thorough mixing was effected in a kneader at 90°C for 110 minutes to yield a dry material. 18 parts of basic aluminium carbonate were added to the dry material, which was then crushed in a pot mill to yield a melamine resin moulding composition.

EXAMPLE 4

An urea resin syrup was prepared as described in Example 1, and to it were added 0.05 part of ammonium chloride, 60 parts of pulp, 0.5 part of zinc oxide, 0.2 part of zinc stearate, 17 parts of a liquid acrylonitrile-butadiene rubber with carboxyl end groups (mean molecular weight 3,400) and 8 parts of a bisphenol A/epichlorohydrin type epoxy resin (melting point 25°C, mean molecular weight 470, epoxy equivalent weight 240). This mixture was thoroughly kneaded in a kneader and dried at 80°C for 95 minutes in a hot air dryer. 100 parts of the dry material was mixed with 0.2 part of zinc stearate and crushed in a pot mill to yield an urea resin moulding composition.

EXAMPLE 5

305 parts of an urea resin syrup, made as described in Example 1, were mixed with 0.05 part of ammonium chloride, 70 parts of pulp, 0.5 part of zinc oxide, 0.2 part of zinc stearate, 23 parts of a liquid acrylonitrile butadiene rubber with carboxyl end groups (mean molecular weight 4,300), 5 parts of a bisphenol A/epichlorohydrin type epoxy resin (m.p. 10°C, mean molecular weight 380, epoxy equivalent weight 187), and 0.5 part ethylene diamine. The mixture was dried at 80°C for 100 minutes with a hot air dryer, and 0.3 part of zinc stearate was added per 100 parts of the dry material. The resultant mixture was crushed in a pot mill to yield an urea resin moulding composition.

EXAMPLE 6

305 parts of urea resin syrup obtained as in Example 1 was mixed with 0.05 part of ammonium chloride, 65 parts of pulp, 0.5 part of zinc oxide, 0.2 part of zinc stearate, 11 parts of a liquid acrylonitrile-butadiene rubber with carboxyl end groups (mean molecular weight 3,400) 15 parts of an ethylene glycol / epichlorohydrin epoxy resin (m.p. 18°C, mean molecular weight 320, epoxy equivalent weight 205), and 0.2 part of diethylene triamine. The mixture was dried at 80°C for 90 minutes in a hot air dryer 0.3 part of zinc stearate per 100 parts dry material was added, and the mixture was crushed in a pot mill to yield an urea resin moulding composition.

Comparative Examples 7 and 8 are compared with Examples 1 to 3 in Table 1 hereafter, and Comparative Examples 9 and 10 are compared with Examples 4 to 6 in Table 11 hereafter, Japanese Industrial Industrail Standards being used for the tests.

COMPARATIVE EXAMPLE 7

Example 1 was repeated, except that the ammonium chloride and liquid acrylonitrile-butadiene rubber were omitted and 4.5 parts of dimethoxysilylpropylenediamine were added as glass fibre surface treatment agent.

COMPARATIVE EXAMPLE 8

305 parts of an urea resin syrup, made as described in Example 1, 60 parts of pulp, 0.5 part of zinc oxide and 0.4 part of zinc stearate were thoroughly mixed in a kneader and then dried at 80°C for 85 minutes in a hot air dryer; the dry material was crushed in a pot mill to yield a moulding composition.

Table 1

| Test | Example 1 | 2 | 3 | 7 | 8 |
|---|---|---|---|---|---|
| Charpy impact value (kg-cm/cm2) | 10.5 | 4.3 | 2.5 | 8.3 | 2.0 |
| Bending Strength (kg/mm2) | 11.3 | 10.2 | 10.0 | 7.0 | 10.5 |
| Forming shrinkage % | 0.60 | 0.65 | 0.55 | 0.63 | 0.75 |
| Water Absorption % | 0.54 | 0.65 | 0.48 | 0.67 | 0.82 |
| External Appearance (Macroscopically) | Good | Good | Good | Poor | Good |

COMPARATIVE EXAMPLE 9

305 parts of urea resin syrup, made as described in Example 1, were thoroughly mixed with 60 parts of pulp, 0.5 part of zinc oxide and 0.2 part of zinc stearate in a kneader, and the mixture was dried at 80°C for 90 minutes in a hot air dryer. The dry material was crushed in a pot mill to yield a moulding composition.

COMPARATIVE EXAMPLE 10

305 parts of urea resin syrup, made as described in Example 1, 60 parts of pulp, 0.5 part of zinc oxide, 0.2 part of zinc stearate and 17 parts of liquid acrylonitrile-butadiene rubber with carboxyl end groups (mean molecular weight 3,400) were mixed in a kneader, and the mixture was dried for 95 minutes at 80°C in a hot air dryer. 0.2 part of zinc stearate per 100 parts of the dry material was added and the material was crushed in a pot mill to yield a moulding composition.

Table 2

| Test | Example | | | | |
|---|---|---|---|---|---|
|  | 4 | 5 | 6 | 9 | 10 |
| Charpy impact value (kg-cm/cm2) | 3.5 | 4.0 | 3.2 | 2.0 | 2.5 |
| Insertion Property* (number of times) | 8.0 | 12.0 | 6.0 | 3.0 | 6.0 |
| Bending Strength (kg/mm2) | 9.0 | 8.7 | 9.6 | 10.0 | 7.2 |
| External Appearance** | Good | Good | Good | Good | Poor |

*Insertion property is indicated by the number of cycles of from 105°C to normal temperature through which a moulded article, 7 mm thick and 60 mm in diameter embedding a steel sheet 3 mm thick and 52.5 mm in diameter, can be subjected before generation of cracks is apparent.
**Determined by whether liquid rubber "bleeds" from the surface of a moulded article.

I claim:

1. A modified aminoplast resin moulding composition comprising
   a. an aminoformaldehyde resin;
   b. a liquid rubber which is selected from the group consisting of
      i. a carboxyl- or mercaptan-terminated acrylonitrile-butadiene rubber having a molecular weight of from 1,000 to 10,000, in an amount from 0.1 to 8 parts by weight per 100 parts by weight of the aminoformaldehyde resin; and
      ii. a carboxyl-terminated acrylonitrile-butadiene rubber chain extended by reaction with an epoxy resin having an epoxy functionality of not more than two, said epoxy resin being present in an amount of from 5 to 100 parts by weight per 100 parts by weight of the carboxyl-terminated rubber, and said chain-extended rubber being present in an amount of from 2.5 to 20 parts by weight per 100 parts by weight of the aminoformaldehyde resin; and
   c. a filler.

* * * * *